(12) United States Patent
Kuwata et al.

(10) Patent No.: US 7,430,597 B2
(45) Date of Patent: Sep. 30, 2008

(54) SYSTEM AND METHOD FOR TRACKING WEB-BASED SESSIONS

(75) Inventors: Katie Kuwata, Oceanside, CA (US); Truc Nguyen, San Diego, CA (US); William Su, Riverside, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 787 days.

(21) Appl. No.: 10/675,687

(22) Filed: Sep. 30, 2003

(65) Prior Publication Data

US 2005/0071464 A1    Mar. 31, 2005

(51) Int. Cl.
G06F 15/16    (2006.01)
G06F 15/173    (2006.01)

(52) U.S. Cl. ..................................... 709/224; 709/203
(58) Field of Classification Search .................. 709/203, 709/223–229
See application file for complete search history.

(56) References Cited

U.S. PATENT DOCUMENTS

| | | | |
|---|---|---|---|
| 6,035,404 A | 3/2000 | Zhao | |
| 6,230,200 B1 | 5/2001 | Forecast et al. | |
| 6,446,225 B1 | 9/2002 | Robsman et al. | |
| 6,466,983 B1 | 10/2002 | Strazza | |
| 6,490,624 B1 | 12/2002 | Sampson et al. | |
| 6,963,908 B1* | 11/2005 | Lynch et al. | 709/220 |
| 7,100,122 B2* | 8/2006 | Blaschke et al. | 715/808 |
| 2002/0161893 A1 | 10/2002 | Wical | |
| 2002/0165971 A1 | 11/2002 | Baron | |
| 2002/0174220 A1 | 11/2002 | Johnson | |
| 2003/0009562 A1* | 1/2003 | Heymann et al. | 709/227 |
| 2003/0046409 A1 | 3/2003 | Graham | |
| 2003/0055913 A1 | 3/2003 | Harkin et al. | |
| 2003/0112271 A1* | 6/2003 | Batalden et al. | 345/744 |

* cited by examiner

*Primary Examiner*—David Lazaro
(74) *Attorney, Agent, or Firm*—Tucker Ellis & West LLP

(57) ABSTRACT

This invention is directed to a system and method for tracking sessions for web-based applications. The system and method comprise a browser disposed on an associated data terminal and having at least one browser window associated therewith. The browser is adapted to generate at least one interactive session with an associated web server. The system and method also comprises at least one session tracking application associated with an interactive session. The session tracking application includes monitoring means adapted for monitoring activity on the associated interactive session and testing means adapted for determining whether monitored activity includes an unload event. The session tracking application also includes termination means adapted for terminating the associated interactive session upon a determination of a selected unload event and notification means adapted for notifying the associated web server to close out the interactive session.

16 Claims, 2 Drawing Sheets

SYSTEM AND METHOD FOR TRACKING WEB-BASED SESSIONS

BACKGROUND OF THE INVENTION

This invention is directed to a system and method for tracking sessions for web-based applications. More particularly, this invention is directed to a system and method for terminating sessions for web-based applications.

Web-based applications are accessed by client users using web browsers, which access a web server and create a session. The session is stored on the server side and the web server tracks the session, which belongs to each client. The session can be associated with data generated from requests from the browser.

Generally, the web server destroys a session when the session times out. The session time out can be set to a variable length. If a session has not been accessed for a certain period of time, the server closes the session to reclaim resources. Even after a user closes the browser application, the particular session will not expire until the timeout has been reached. If the timeout is set to one hundred twenty minutes, and if the user closes the browser five minutes after starting, the server will keep the session active unnecessarily for another one hundred fifteen minutes. This becomes a serious disadvantage, especially in an embedded server environment with a small memory and small workspaces. The server may keep the memory allocated even after the session is no longer user.

Another problem is the limit on the number of allowable concurrent sessions. In the embedded server environment, the web server may keep tracking the active number of sessions to limit their usage. Even after a user closes his browser and is no longer browsing the web site, the web server keeps the session in memory until the session is timed out. Therefore, even if the system does not reach the maximum number of sessions in memory, and if it is at the maximum, the system will deny a new user access until sufficient resources have been freed.

An additional problem involves session-based file locking systems. If the web server uses a session-based file locking system, the file may be locked and is not available to others until the session is timed out, even if the user closes the browser before the timeout period.

Another problem is when a user does not close the browser, but moves away from the web site to another web site. In this situation, the session should be terminated, not only for the reasons described above, but also for security reasons. A user logged in as administrator or a private user can access secured or private pages. When this user moves away from such a site, the session should be terminated to that another login is required when the user returns to such site.

There is a need for a system and method for tracking sessions for web-based applications which terminates the session in response to selected actions by the user and provides increased security for secure or private web pages.

SUMMARY OF THE INVENTION

In accordance with the present invention, there is provided a system and method for tracking sessions for web-based applications which terminates the session in response to selected actions by the user.

Further, in accordance with the present invention, there is provided a system and method for tracking sessions for web-based application which provides increased security for secure or private web pages.

Further, in accordance with the present invention, there is provided a system for tracking sessions for web-based applications comprising a browser disposed on an associated data terminal and having at least one browser window associated therewith. The browser is adapted to generate at least one interactive session with an associated web server. The system also includes at least one session tracking application associated with an interactive session. The session tracking application includes monitoring means adapted for monitoring activity on the associated interactive session and testing means adapted for determining whether monitored activity includes an unload event. The session tracking application also includes termination means adapted for terminating the associated interactive session upon a determination of a selected unload event and notification means adapted for notifying the associated web server to close out the interactive session.

In a preferred embodiment, the testing means includes counting means adapted for determining the number of browser windows associated with the at least one interactive session. Preferably, the number of browser windows associated with at least one interactive session are stored in associated memory or other suitable data storage means. In another preferred embodiment, the testing means includes means adapted for testing at least one of a browser refresh, browser close, migration from a selected web site, opening of an additional web site by a browser window associated with the interactive session, and session timeout.

Still further, in accordance with the present invention, there is provided a method for tracking sessions for web-based applications comprising the steps of generating at least one interactive session with an associated web server, wherein the interactive session is generated via a browser disposed on an associated data terminal and having at least one browser window associated therewith, monitoring activity on the interactive session, and determining whether monitored activity includes an unload event. The method also comprises the steps of terminating the interactive session upon a determination of a selected unload event and notifying the associated web server to close out the interactive session.

In a preferred embodiment, the method further includes the step of determining the number of browser windows associated with the at least one interactive session. Preferably, the number of browser windows associated with at least one interactive session are stored in associated memory means. In another preferred embodiment, the step of determining the monitored activity includes determining whether the activity is at least one of a browser refresh, browser close, migration from a selected web site, opening of an additional web site by a browser window associated with the interactive session, and session timeout.

These and other aspects, advantages, and features of the invention will be apparent to one skilled in the art upon reading and understanding the specification.

DETAILED DESCRIPTION OF THE PREFERRED EMBODIMENTS

This invention is directed to a system and method for tracking sessions for web-based applications, particularly for terminating sessions for web-based applications. This invention uses a background window or application and a session tracking application to track and terminate sessions. A request is sent to an associated web server to terminate the session when a browser receives a browser close request or migration to another web site request only if one browser is using the session. The session tracking application monitors session identification information and the number of browsers using the same session, stores the information in a session table in memory, and periodically updates the information. The invention prevents the session from being destroyed when a user closes one of the browser windows that share the same session.

Figure 1:
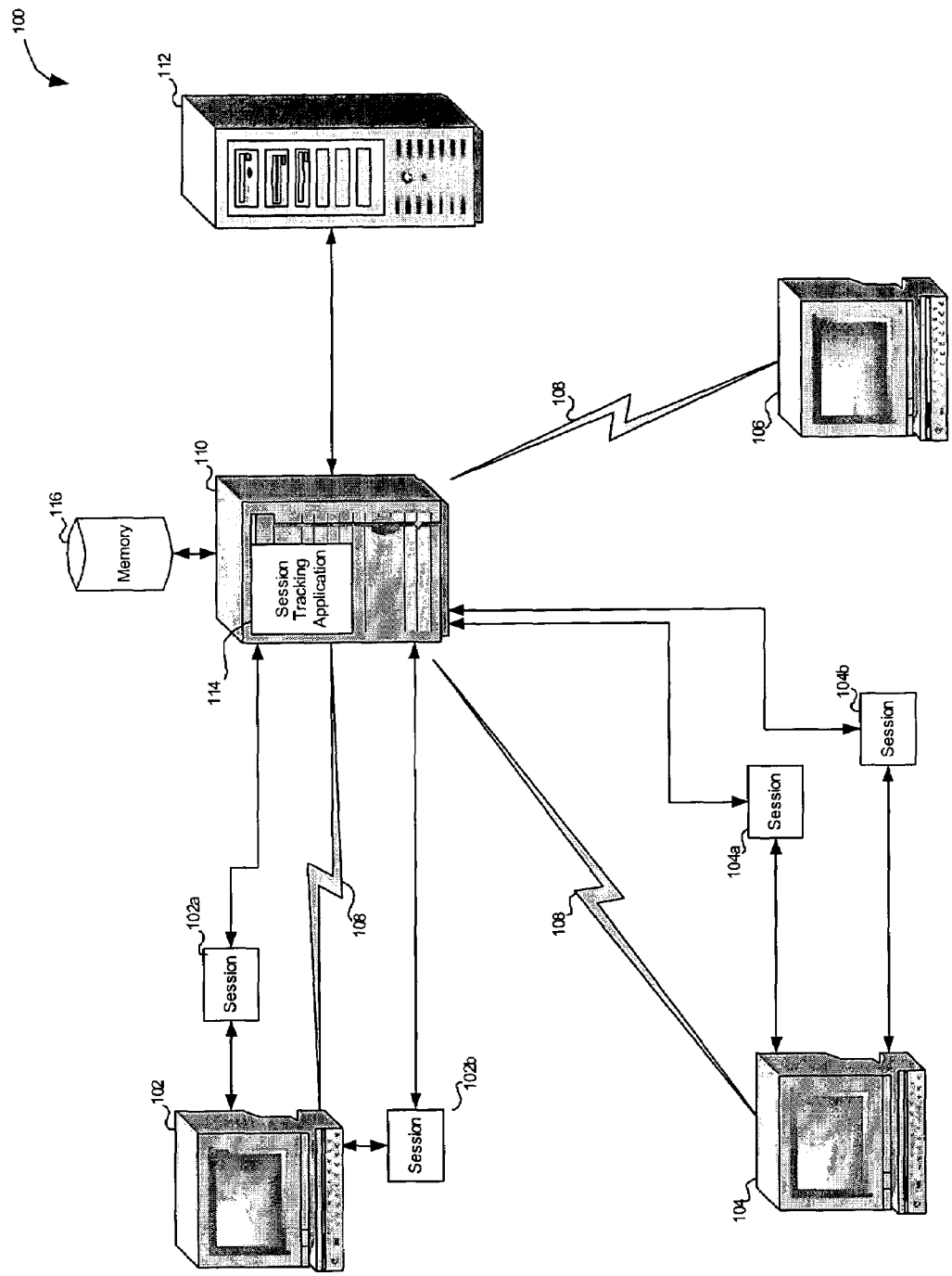
FIG. 1 is a block diagram depicting an exemplary network configured to deploy the method and implementation of the present invention.

A suitable network 100 is shown in FIG. 1 for deploying the method and implementation of the present invention. One or more client machines, as illustrated with three machines 102, 104, and 106, send session requests 108 which are received and responded to by a controller 110 on the network. A suitable client machine is any suitable networked computer or data terminal as will be appreciated by one of ordinary skill in the art. Each client machine includes a browser (not shown) which is used to access the web server to initiate a session. The browser is any suitable browser program known in the art, such as Internet Explorer, Netscape Navigator, or Mozilla. The controller 110 governs access to the web server 112 that serves the requests received from the users. Each client suitably has multiple sessions 102a, 102b, 104a, and 104b. The controller includes a session tracking application 114 for monitoring the activity of the sessions and terminating the sessions in the event of certain actions or activities by the user.

The session tracking application also monitors the number of browser windows associated with each session. Each session has a unique session identification associated with the session and which is stored in session table or database in a storage medium or memory 116. The number of browser windows active for each session are associated with the session identification and also stored in the storage medium.

Figure 2:
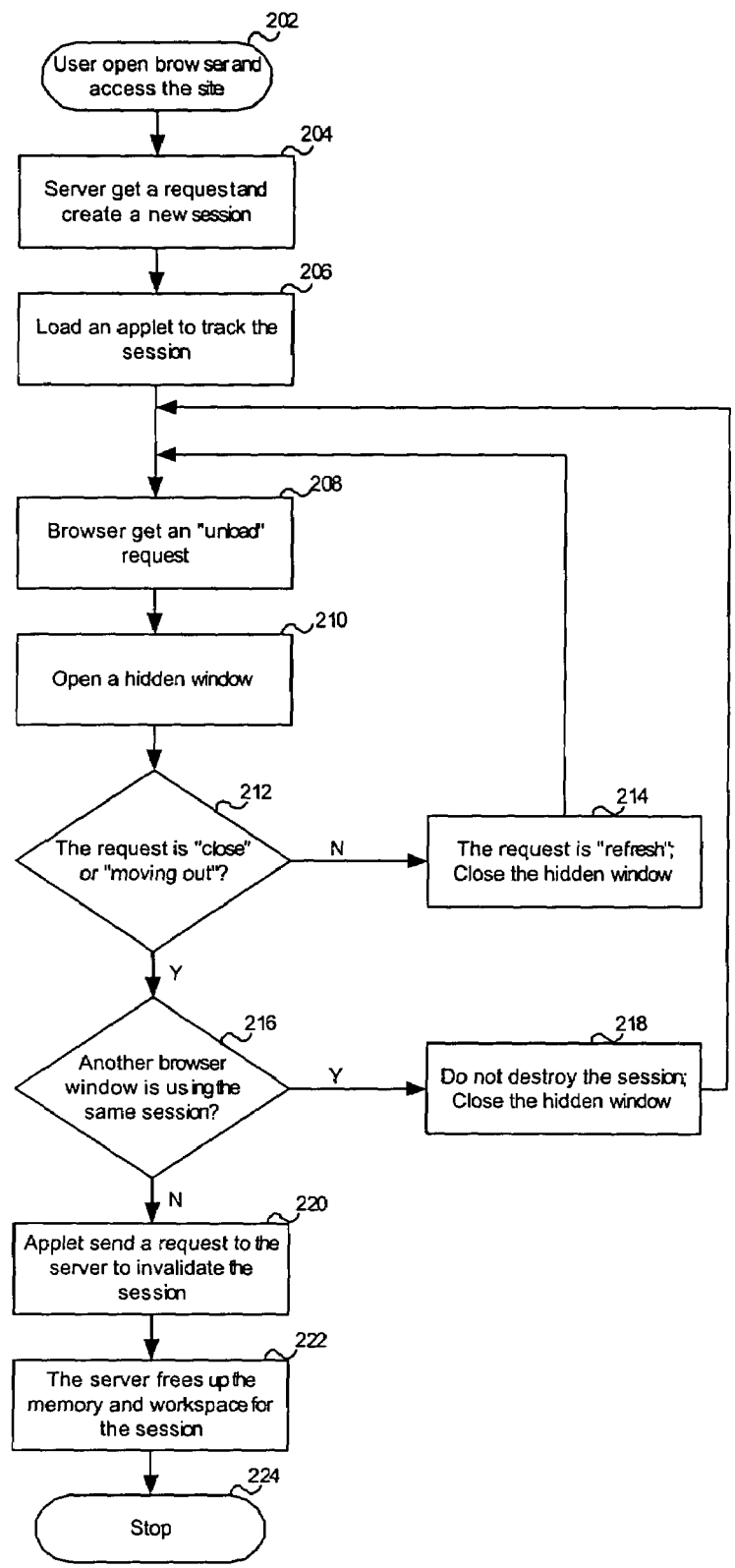
FIG. 2 is a flow chart depicting the steps associated with tracking sessions for web-based applications in accordance with the present invention.

FIG. 2 illustrates a flow chart 200 of the method according to the present invention. At 202, an associated user uses the browser on the client machine to open a browse window to access the web server to initiate a session. At 204, the web server receives the request and creates a new session. The session tracking application is then activated at 206 to track the session if this is the first time the user accessed the web site. If the user has already accessed the web site from another browser window, then the session tracking application was activated when the first browser window was opened.

The session tracking application determines if this a new session for this web site or if another browser window has accessed the web site. If it is determined that this is new session, then the session identification information is generated to identify the session by any suitable means. A counting means associates an counter with the session identification information by any suitable means and the counter is set to one to show that one browser is associated with the session. The session identification and the counter are stored in the session table in the storage medium. If it is determined that this not a new session, but that the web site has already been accessed from another browser window, the counter for the session is incremented by one for this additional browser by any suitable means. The session identification and the updated counter information are stored in the session table in the storage medium.

Flow then progress to 208 wherein the browser receives an unload event request. Unload events include, but are not limited to browser refresh, browser close, and migration from a selected web site. At 210, a background or hidden window or application is opened to determine the type of unload event received. At 212, a determination is made if the unload event request is a browser close or a migration from a selected web site request.

If the unload event is not such event, the unload event request is a browser refresh request as shown at 214. The hidden window is closed and flow returns to 208, wherein the system waits for another unload event request to be received.

If the unload event is a browser close request or a migration from a selected web site request, flow proceeds to 216 wherein a determination is made as to whether another browser window is using the same session. If it is determined that another browser window is using the same session, flow progress to 218. The session is not terminated and the hidden window is closed. The counter decreases the number of browsers associated with the interactive session upon the browser close action or migration from a web site by one of the browser windows associated with the interactive session by any suitable means. The updated counter information is stored in the session table in the storage medium. Flow returns to 208, wherein the system waits for another unload event request to be received.

If it is determined that another browser is not using the same session, flow proceeds to 220, wherein the session tracking application sends a request to the web server to invalidate the session. Once the system receives the request, the server frees up the memory and the workspace allocated for the session as shown in 222 and the method terminates at 224.

In the event the session continues until the timeout period is reached, the browser sends a request to the server (not shown). The server determines if the session is invalid due to the timeout. If the session is invalid due to the timeout, the server frees up the memory and the workspace allocated for session.

The system and method of the present invention also provide increased security for secure or private web pages. In ordinary web-based applications, when a user logins into a site and then migrates to a new site, the user can activate the "back" button or other suitable return means on the browser to return to the site. Such web-based applications will not request the user to login again to access the pages. Therefore, if the user were to access a secure site, migrate to a new site, and then leave the browser open on the client machine, another user could simply activate the back button and return to the secure pages. In this invention, if the user were to migrate to another site after accessing such secure site, such an action would be an unload event and the session would be terminated if no other browser windows were associated with the session. Another user would not be able to return to the secure pages by only activating the back button.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A system for tracking web-based sessions comprising:
    a browser disposed on an associated data terminal and having at least one visible browser window associated therewith, which browser is adapted for generating at least one interactive session with an associated web server; and
    at least one session tracking application associated with an interactive session, which session tracking application includes, monitoring means adapted for monitoring activity of the associated interactive session, means adapted for initiating a counter to an opening value in accordance with a session identifier of an initial instance associated with the interactive session, unload event testing means adapted for determining whether monitored activity includes an unload event, means adapted for spawning a hidden browser window upon determination of the unload event, which hidden browser window enables a termination means, instance opening test means adapted for determining when monitored activity includes opening of an additional instance of the associated interactive session, instance closing test means adapted for determining when monitored activity includes a closing of an instance of the associated interactive session, incrementing means adapted for incrementing a counter in accordance with each instance determined by the instance opening testing means, decrementing means adapted for decrementing the counter in accordance with an output of the instance closing test means, and means adapted for testing a current counter value; and wherein the hidden browser window includes termination means adapted for generating a termination signal to the at least one session tracking session application so as to commence a termination of the associated interactive session upon a determination of an unload event by the session tracking application when a current counter value reaches a selected value relative to the opening value; and the at least one session tracking session commences operation of a notification means adapted for notifying the associated web server to close out the interactive session in accordance with a received termination signal from the termination means.

2. The system for tracking web-based sessions of claim 1, further comprising storage means adapted for storing data associated with the interactive session.

3. The system for tracking web-based sessions of claim 1, wherein upon generating an interactive session, the monitoring means associates session identifying information with the session, the incrementing means increments the number of browser windows associated with the interactive session by one, and the storage means stores the session identifying information and incremented number of browser windows associated with the interactive session in the storage means.

4. The system for tracking web-based sessions of claim 1, wherein the unload event testing means includes means adapted for testing at least one of a browser refresh, browser close, migration from a selected web site, opening of an additional web site by a browser window associated with the interactive session, and session timeout.

5. The system for tracking web-based sessions of claim 4, wherein in the event the unload event testing means determines that the monitored activity is a browser refresh, the termination means does not terminate the associated interactive session.

6. The system for tracking web-based sessions of claim 4, wherein in the event the unload event testing means determines that the monitored activity is a browser close or a migration from a selected website, the decrementing means decrements the counter.

7. The system for tracking web-based sessions of claim 1, wherein in the event the activity monitored is opening of an additional web site by a browser window associated with the interactive session, the incrementing means increases the number of browser windows associated with the interactive session.

8. The system for tracking web-based sessions of claim 1, wherein in the event the activity monitored is a session timeout, the terminating mean terminates the interactive session.

9. A method for tracking web-based sessions comprising the steps of:

generating at least one interactive session with an associated web server, wherein the interactive session is generated via a browser disposed on an associated data terminal and having at least one browser window associated therewith;

monitoring activity of the associated interactive session;

initiating a counter to an opening value in accordance with a session identifier of an initial instance associated with the interactive session;

determining whether monitored activity includes an unload event;

spawning a hidden browser window upon determination of the unload event, which hidden browser window enables the termination step;

determining when monitored activity includes opening of an additional instance of the associated interactive session;

determining when monitored activity includes a closing of an instance of the associated interactive session;

incrementing a counter in accordance with each instance determined to be additional instance of the associated interactive session;

decrementing the counter in accordance with a closing of an instance of the associated interactive session;

testing a current counter value;

generating a termination signal to the at least one session tracking session so as to commence a termination of the associated interactive session upon a determination of an unload event by the session tracking application when a current counter value reaches a selected value relative to the opening value, and notifying the associated web server to close out the interactive session in accordance with a received termination signal.

10. The method for tracking web-based sessions of claim 9, further comprising the step of storing data associated with the interactive session in an associated storage.

11. The method for tracking web-based sessions of claim 9, wherein upon generating an interactive session, session identifying information is associated with the session, the number of browser windows associated with the interactive session is incremented by one, and the session identifying information and incremented number of browser windows associated with the interactive session is stored in the associated storage.

12. The method for tracking web-based sessions of claim 9, wherein the step of determine whether an activity is an unload event includes testing at least one of a browser refresh, browser close, migration from a selected web site, opening of an additional web site by a browser window associated with the interactive session, and session timeout.

13. The method for tracking web-based sessions of claim 12, wherein in the event that the monitored activity is determined to be a browser refresh, the associated interactive session is terminated.

14. The method for tracking web-based sessions of claim 12, wherein in the event that the monitored activity is determined to be a browser close or a migration from a selected website, the counter is decremented.

15. The method for tracking web-based sessions of claim 9, wherein in the event the activity monitored is opening of an additional web site by a browser window associated with the interactive session, the number of browser windows associated with the interactive session is increased.

16. The method for tracking web-based sessions of claim 9, wherein in the event the activity monitored is a session timeout, the interactive session is terminated.

* * * * *